United States Patent [19]

Nagai et al.

[11] Patent Number: 4,545,588
[45] Date of Patent: Oct. 8, 1985

[54] MECHANICAL FACE SEAL FOR SEALING SLURRY LIQUID

[75] Inventors: Yataro Nagai; Kazuya Fukuoka, both of Tokyo, Japan

[73] Assignee: Tanken Seiko Corp., Tokyo, Japan

[21] Appl. No.: 628,241

[22] Filed: Jul. 6, 1984

[30] Foreign Application Priority Data

Jul. 8, 1983 [JP] Japan ............................ 58-105397[U]
Nov. 4, 1983 [JP] Japan ............................ 58-170125[U]
Nov. 28, 1983 [JP] Japan ............................ 58-182130[U]

[51] Int. Cl.⁴ ............................................. F16J 15/38
[52] U.S. Cl. ................................ 277/93 SD; 277/82; 277/87; 277/134; 277/135
[58] Field of Search .................................. 277/85–87, 277/81 R, 82, 93 R, 93 SD, 203, 204, 134, 135

[56] References Cited

U.S. PATENT DOCUMENTS

| 1,997,613 | 4/1935 | Vroom | 277/134 X |
| 2,096,329 | 10/1937 | Kagi | 277/82 |
| 2,201,478 | 5/1940 | Czarnecki et al. | 277/93 X |
| 2,297,477 | 9/1942 | Huhn et al. | 277/87 |
| 2,354,478 | 7/1944 | Reinhardt et al. | 277/82 X |
| 3,578,803 | 5/1971 | Huhn | 277/93 X |
| 3,746,350 | 7/1973 | Mayer et al. | 277/134 X |
| 3,765,689 | 10/1973 | Adams | 277/81 R X |
| 4,084,825 | 4/1978 | Ludwig | 277/134 X |
| 4,243,230 | 1/1981 | Baker et al. | 277/134 X |

FOREIGN PATENT DOCUMENTS 6696 of 1911 United Kingdom ................ 277/135
148932 10/1921 United Kingdom .................. 277/82

Primary Examiner—Robert S. Ward
Attorney, Agent, or Firm—Frishauf, Holtz, Goodman & Woodward

[57] ABSTRACT

A mechanical seal for sealing a slurry liquid between a casing and a rotary shaft comprises a fixed seat ring; a rotatable slide ring in the casing and abutting against the seat ring to form a sealing face therebetween; a helical spring in the casing and surrounding the rotary shaft, and biassing the rotatable slide ring toward the seat ring; and a rotatable ring on the rotary shaft and rotatable with the rotary shaft and holding the spring at a predetermined position relative to the rotary shaft, the spring being interposed between the rotatable slide ring and the rotatable ring. A small space is provided between the casing and the rotatable ring and the rotatable ring has a helical projection on the outer surface thereof. The helical projection of the rotatable ring and the helical spring are directed such that upon rotation thereof a force is produced in a direction away from the sealing face and toward the interior of the casing. The spring is preferably a helical screw-thread-like member of rectangular cross-section.

21 Claims, 10 Drawing Figures

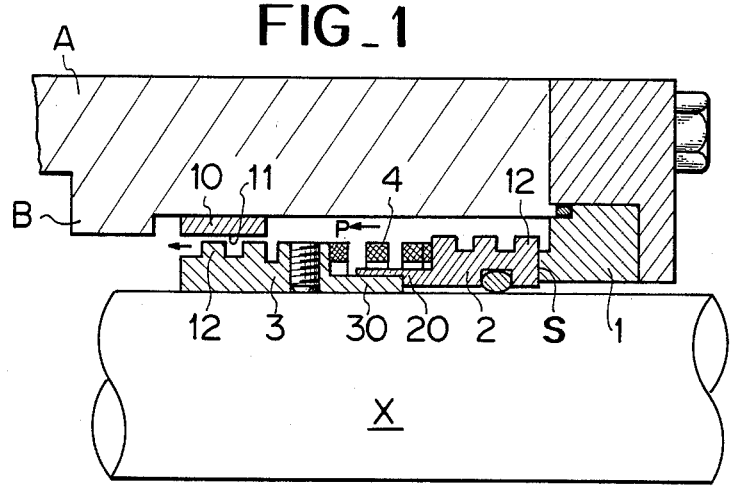
FIG_1
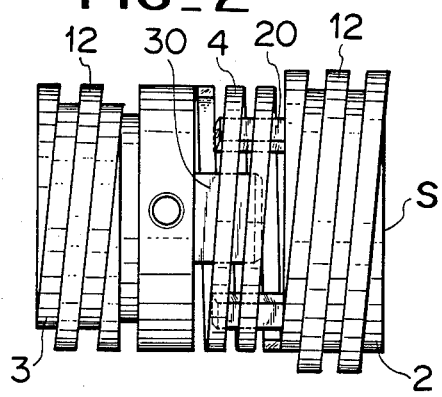
FIG_2
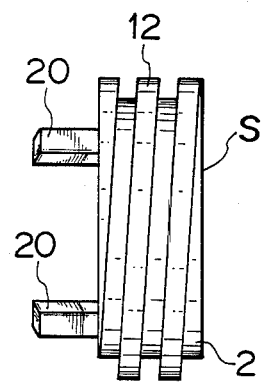
FIG_3
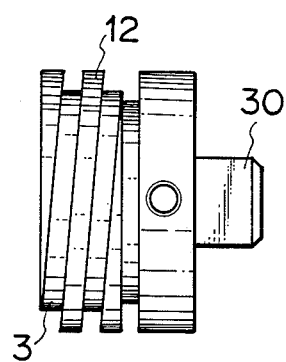
FIG_4
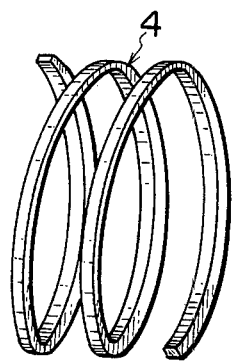
FIG_5

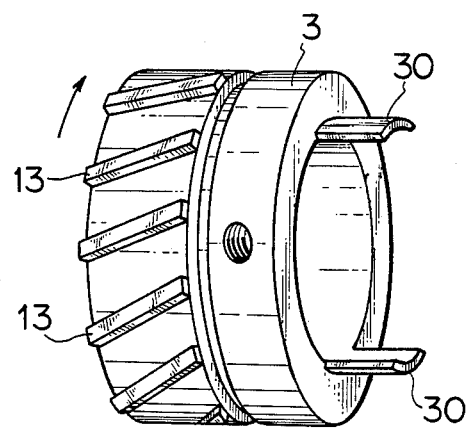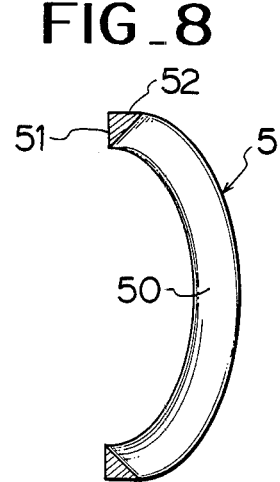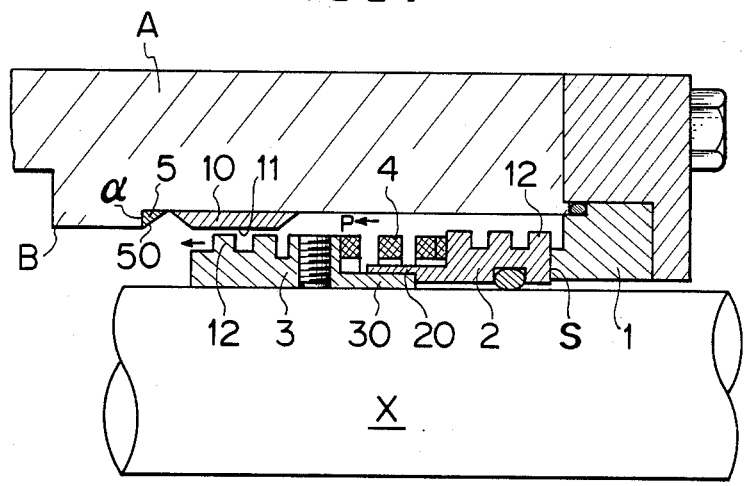

FIG_9
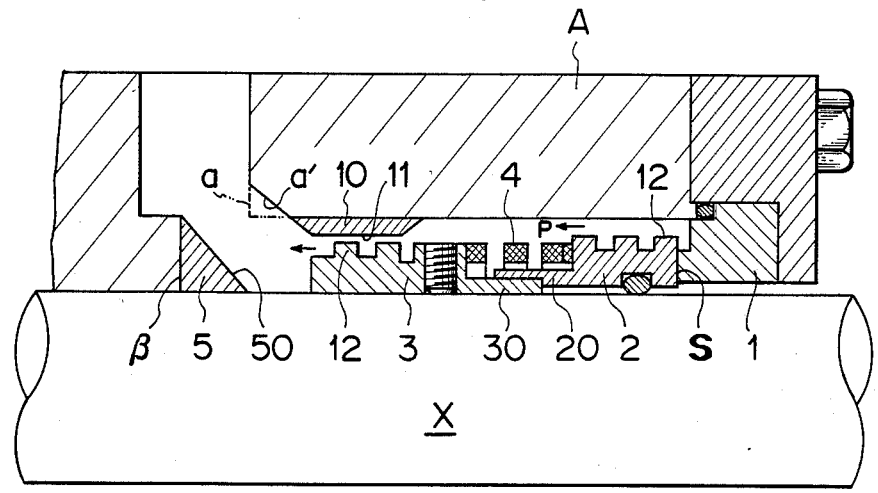
FIG_10
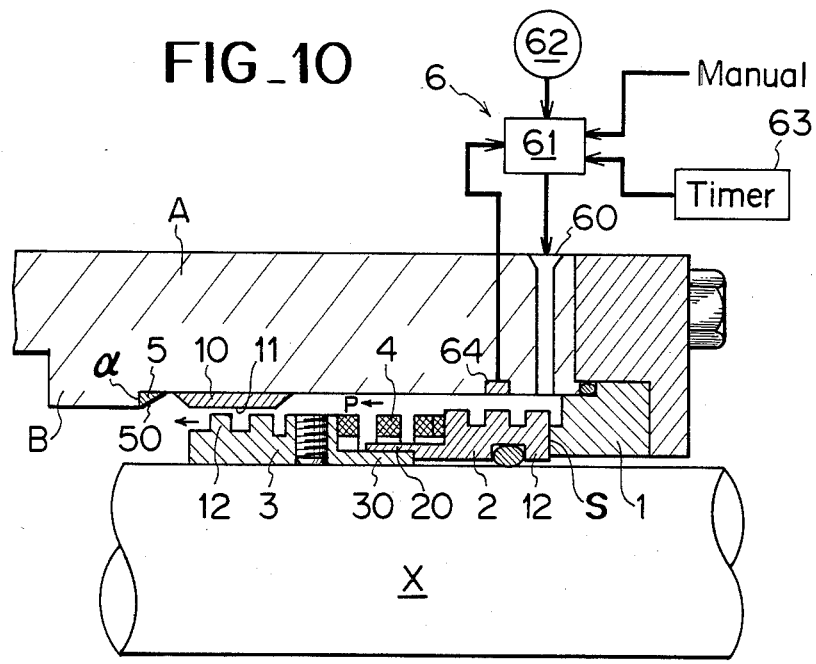

MECHANICAL FACE SEAL FOR SEALING SLURRY LIQUID

BACKGROUND OF THE INVENTION

This invention relates to a mechanical seal.

When a sealing liquid is a slurry liquid such as a pulp slurry or the like solid materials invade into a sealing face clog into a spring or the like, and various troubles are caused, such as imperfect sealing due to abrasions in the sealing face or unsatisfactory sliding of a slide ring.

Therefore, the prior art has devised to supply a clean liquid from the outside, or to provide a souble mechanical seal.

Using the prior technique of supplying clean liquid from the outside, the above-mentioned defects are removed. However, a new problem arises in that the sealing liquid is diluted. On the other hand, when the amount of supplied clean liquid is decreased to avoid said dilution of the sealing liquid, those defects as above mentioned cannot be solved satisfactorily.

Although the double mechanical seal does not involve a problem of dilution of the sealing liquid, the structure thereof is complicated and increases cost of the apparatus.

SUMMARY OF THE INVENTION

The object of the present invention is to overcome the above mentioned defects of the prior art, and is to provide a mechanical seal suited for sealing a slurry liquid.

The mechanical seal according to the invention has a seat ring, a rotatable slide ring, at least one spring, and a spring stopper.

The seat ring is attached to a casing, and the rotatable slide ring contacts, in a rotating and sliding manner, the seat ring from an inside of the casing to form a sealing face. The rotatable slide ring is pressed against the seat ring by a spring. A base of the spring in opposition to the rotatable slide ring is held by the spring stopper which is fixed to or formed integrally with a rotary shaft.

In the invention, at least one member of these members rotating together with the shaft, i.e., the spring stopper, the at least one spring, and the rotatable slide ring, is provided with a helical projection (which may be formed integrally). Rotation of the helical projection forces the slurry liquid staying in the casing to move in an opposite direction to the sealing face.

In a preferred embodiment, the spring stopper comprises a rotary ring which is fixedly mounted on the rotary shaft and which is formed with the helical projection on an outer surface thereof. Further, a squeeze part is defined by making narrow a space between the outer surface of the rotary ring and an inner surface of the casing corresponding thereto. When the helical projection is rotated in the squeeze part, a strong force is actuated within the narrow space toward an apparatus provided with the present mechanical seal, so that solid materials in the slurry liquid are pushed away toward said apparatus, and the density of the liquid on the sealing face within the casing is reduced (i.e., the liquid is diluted) to result in preventing the invasion of the solid material into the sealing face.

In a further preferred embodiment, the spring is a single helical spring mounted on the shaft. The cross section of the helical spring is square, not round as is conventional, and the spring is bare in the sealing liquid. That is, the spring per se is shaped helically as a whole, thereby to similarly produce a force in the sealing liquid acting in opposition to the sealing face. This force is heightened in comparison with the conventional round cross section by making square the cross section of the spring.

In yet a further preferred embodiment, the helical projection is provided, and a taper ring is secured to a convex shape formed within the casing.

In a pump for a slurry, it is ordinarily practiced that the casing has a convex shape on its inside, e.g. a neck bush, which extends toward an inside of a radius direction of the casing. Through the present inventors' studies, it has been made clear that the ordinary prior art convex shape considerably hinders exhausting of the solid materials by the helical projection. In view of such circumstances, a taper ring is disposed on a side perpendicular to an axial direction of the convex shape at the side of the sealing face, so that the perpendicularity is changed into a taper shape. This taper shape avoids said hindrance of exhausting the solid materials by the helical projection.

The above mentioned preferred structures may be employed independently or in any combination.

The helical projection may be defined integrally with the rotary body by machining, or may be a separate member fixed thereto by welding.

BRIEF DESCRIPTION OF THE DRAWINGS

FIG. 1 is a part cross sectional view showing one embodiment of a mechanical seal according to the invention;

FIG. 2 is a front view showing a seat ring, a rotatable slide ring and a spring;

FIG. 3 is a front view of a seat ring;

FIG. 4 is a front view of a rotatable slide ring;

FIG. 5 is a perspective view of a spring;

FIG. 6 is a perspective view of a rotary ring restraining the spring provided with vanes;

FIG. 7 is a part cross sectional view showing another embodiment of a mechanical seal according to the invention;

FIG. 8 is a perspective sectional view of a half-divided taper ring;

FIG. 9 is a part cross sectional view of a further embodiment of a mechanical seal according to the invention; and FIG. 10 is a part cross sectional view of an embodiment provided with a flushing device.

DETAILED DESCRIPTION

FIG. 1 is a part cross sectional view showing an example of applying the invention to a mechanical seal of a slurry pump. In FIG. 1, X is a rotary shaft and A is a casing. Reference numeral 1 is a fixed seat ring, 2 and 3 are rotary rings respectively (2 is a rotatable slide ring and 3 is a rotatable ring or collar), and 4 is a helical pressing spring. The casing A is provided with a ring shaped inwardly projecting member 10 at a portion thereof corresponding to the rotatable ring or collar 3 and is formed with a squeezing part 11 in relation with the ring or collar 3. In this embodiment, the projecting member 10 is formed by fixing a ring-like bush to the interior of the casing A. Alternatively, an integrally formed neck bush B positioned at said corresponding portion may be utilized as the projecting member 10.

The collar 3 is formed with a screw thread 12 on its outer circumference, such that fluid flow is effected in the direction of the arrow around the squeezing part 11. The screw 12 is devised to cause the fluid to flow in the direction of the arrow due to rotation of the shaft X.

Instead of the screw 12, vanes 13 may be furnished as seen in FIG. 6. If the vanes 13 are made square or trapezoidal in cross section as shown in FIG. 6, solid materials in the slurry are exhausted more effectively. Further, the vanes 13 should be obliquely provided as shown, not parallel to an axial direction of the collar 3, and may be curved in a spiral form. The oblique direction depends upon rotating direction of the rotary ring, and is determined in a direction so as to generate the flow in the arrowed direction in FIG. 1.

In the embodiment shown in FIG. 1, another screw thread 12 is also formed on the outer circumference of the slide ring 2 for exhausting solid materials around a sealing face S. Also in this case, vanes such as shown in FIG. 6 may be employed in place of the screw 12.

The spring 4 is exposed without shielding its outside, and contacts the sealing liquid. The shape of its cross section is not round but square as seen in FIGS. 1 and 5. The present example shows an almost regular square, but a rectangular or trapezoidal shape may be adopted for the cross section of a spring 4. The coiling direction of the spring 4 depends upon the rotating direction of the rotary ring, and it is determined in a direction so as to generate the flow in the arrowed direction in FIG. 1. In the present screwing direction, if the rotation is transmitted by the spring 4 from the collar 3 to the slide ring 2, the spring 4 is effected with force acting in an expanding direction thereof, and such exertion of the spring is not preferable.

In view of such conditions, in this embodiment, the follower 2 and the collar 3 are, as shown in FIGS. 2 to 4, formed in counterbalance with a plurality of projections 20 and 30 at their bases for transmission of a rotating force.

Since the spring 4 spoils the screw pumping effect if its pitch is too wide or too narrow, the pitch should be selected to provide the most desirable pumping effect.

In the above mentioned structure, the pumping function is worked around the squeezing part 11 by the screw 12 or the vanes 13, so that the solid materials existing in a space P over the projection 10 to the sealing face S move from the projecting member 10 toward the interior of the apparatus employing the present device. As a result, the density of the solid materials in the space P is made light, and the solid materials are checked from invasion into the sealing face S or clogging into the spring 4.

Since the spring 4 is exposed in the sealing liquid and is made square in cross section, the screw-pumping function is largely generated and force is caused in the arrowed direction, and the solid materials as pulps or the like are exhausted from the sealing face S and the spring 4. Thus, the solid materials do not go into the sealing face S or the spring 4.

In this embodiment, as the slide ring 2 is also formed with the screw 12 or the vanes 13, the solid materials are accelerated in exhausting from the vicinity of the sealing face S, so that the solid materials are further prevented from invading into the sealing face S.

FIG. 7 illustrates a further embodiment. As referred to above, in a pump for slurry, it is ordinarily practiced that the casing A has the convex or projection B on its inside, e.g., in the form of a neck bush, which extends inwardly in a radial direction of the casing A. The present inventors' experimental studies have made it clear that the aforementioned projection B considerably hinders said exhausting of the solid materials by the helical projection. In the present invention, a taper ring 5 is disposed on a side α perpendicular to the axial direction of the projection B at the side of the sealing face S. A taper shape 50 is provided on one face of the taper ring 5. As is seen in FIG. 8, the taper ring 5 is a ring having a right-angled triangular cross section. The ring S has two faces 51, 52 intersecting each other at right angles and said taper face 50. Said face 51 is closely attached to the perpendicular side, said face 52 is closely attached to the inner circumference of the casing A, and the taper face 50 is exposed to the sealing liquid at the side of the apparatus.

Due to such a structure, the solid materials are smoothly removed as following the taper face 50 in the arrowed direction by means of the screw 12 or the vanes 13.

The taper ring 5 can be attached at different positions, and FIG. 9 shows an example of attaching the taper ring 5 to a perpendicular face β which extends in a radial direction from the shaft X. In the FIG. 9 embodiment, a corner a of the casing A is cut out to form a taper face a'. By cutting the corner, the slurry is exhausted more effectively.

In the above structure, since the taper ring is disposed adjacent to the projection, and a side right-angled with the axial direction is cut out to form a taper face, the slurry is removed with high efficiency by the screw or the vanes from the mechanical seal portion, and the solid materials in the slurry are prevented from biting into the sealing face.

The above mentioned structure can prevent invasion of the solid materials without using flushing, but addition of flushing to the structure is preferable.

FIG. 10 shows an embodiment providing a flushing device 6. If flushing is undertaken, in general, the sealing liquid is diluted disadvantageously. Therefore, the flushing is performed intermittently in the present invention.

A flushing hole 60 is formed in vicinity of the sealing face S, into which a clean flushing liquid is supplied from a source 62 via a valve 61. The valve 61 is opened per determined time so as to supply the flushing liquid intermittently. Said opening may depend upon manual operation or a timer 63. Furthermore, it is considered that a rising temperature of the slurry is detected by a thermometer 64 to open the valve 61 when the temperature rises above a predetermined temperature. Alternatively, the above mentioned means may be used simultaneously.

The flushing liquid from the hole 60 pushes aside the slurry liquid around the sealing face S, so that the slurry is avoided from staying or clogging and from overheating by a cooling effect thereby at the same time. Since the flushing liquid is supplied intermittently, the slurry is not diluted.

We claim:

1. A mechanical seal for providing a seal for a slurry liquid between a casing and a rotary shaft extending out of said casing, comprising:

a fixed seat ring;

a rotatable slide ring positioned in said casing and abutting against said seat ring to form a sealing face therebetween;

a helical spring positioned in said casing and surrounding said rotary shaft, said spring biassing said rotatable slide ring toward said seat ring;

a rotatable ring on said rotary shaft and rotatable with said rotary shaft, said rotatable ring being positioned in the casing for holding said spring in a predetermined position relative to said rotary shaft, said spring being interposed between said rotatable slide ring and said rotatable ring;

a small space being provided between said casing and said rotatable ring; and said rotatable ring having a helical projection on the outer surface thereof and defining with said casing said small space, said helical projection of said rotatable ring being directed such that upon rotation of said rotary shaft said rotatable ring is rotated and produces a force in a direction away from said sealing face and toward the interior of said casing so as to cause said slurry liquid to move away from said sealing face and toward said interior of said casing.

2. The mechanical seal of claim 1, wherein said helical spring has a rectangular cross-section and is exposed to said sealed liquid.

3. The mechanical seal of claim 2, wherein said helical spring has a square cross-section.

4. The mechanical seal of claim 1, wherein said casing has a projection extending inwardly opposite said helical projection on said rotatable ring, the outer surface of said helical projection and the inner surface of said projection of said casing defining said small space.

5. The mechanical seal of claim 4, wherein said casing comprises a taper ring adjacent said projection, said taper ring having a taper surface adjacent said projection for smooth flow of said slurry in said direction of said force.

6. The mechanical seal of claim 1, wherein said casing comprises:

a projection (B) extending inwardly toward the interior of said casing and being located axially rearwardly of said rotatable ring so that said projection (B) is more interior of the casing than said rotatable ring, said projection having a face ($\alpha$) which is substantially perpendicular to the axis of said rotary shaft; and a taper ring covering said perpendicular face of said projection, said taper ring having an inclined exposed surface which is inclined to the axis of said rotary shaft so that slurry flows over said inclined exposed surface and does not impinge said face of said projection.

7. The mechanical seal of claim 1, wherein said helical spring is exposed in said liquid slurry and has a rectangular cross-sectional shape, said helical spring being rotated to produce a force to cause said slurry to move away from said sealing face and toward said interior of said casing.

8. The mechanical seal of claim 7, wherein said helical spring has a square cross-sectional shape.

9. The mechanical seal of claim 7, wherein said helical projection of said rotatable ring is a helical screw-thread-like member, and wherein said helical spring is a helical screw-like member.

10. The mechanical seal of claim 1, further comprising a flushing means for intermittently flushing a portion around said sealing face with a flushing liquid.

11. The mechanical seal of claim 10, wherein said flushing means comprises an opening in said casing adjacent said sealing face, and means for forcing a flushing fluid through said opening so as to flush a portion around said sealing face with said flushing liquid.

12. The mechanical seal of claim 2, further comprising a flushing means for intermittently flushing a portion around said sealing face with a flushing liquid.

13. The mechanical seal of claim 12, wherein said flushing means comprises an opening in said casing adjacent said sealing face, and means for forcing a flushing fluid through said opening so as to flush a portion around said sealing face with said flushing liquid.

14. The mechanical seal of claim 1, wherein said rotatable slide ring comprises gear means coupled to said rotatable ring so as to rotate with respect to said rotatable ring.

15. The mechanical seal of claim 14, wherein said rotatable ring comprises gear means coupled with said gear means of said rotatable slide ring.

16. The mechanical seal of claim 1, wherein said casing comprises a projection extending toward the interior of said casing and having a surface opposite said helical projection on the outer surface of said rotatable ring, said projection having a taper surface facing the interior of said casing; and a taper ring provided on said casing more interior of said casing from said projection and having a taper surface facing said taper surface of said projection, said taper surfaces being substantially parallel to each other and defining a passage therebetween for exhausting said slurry liquid.

17. The mechanical seal of claim 1, wherein said rotatable slide ring has a helical projection on the outer surface thereof for producing said force in said direction away from said sealing face upon rotation of said rotatable slide ring.

18. The mechanical seal of claim 9, wherein said rotatable slide ring has a helical projection on the outer surface thereof for producing said force in said direction away from said sealing face upon rotation of said rotatable slide ring.

19. The mechanical seal of claim 1, wherein said helical projection of said rotatable ring comprises a plurality of helical vane portions.

20. The mechanical seal of claim 1, wherein said helical projection of said rotatable ring is a helical screw-thread-like member.

21. The mechanical seal of claim 1, wherein said helical spring is directed such that upon rotation of said rotary shaft and rotatable ring, said helical spring is rotated to also produce a force in a direction away from said sealing face and toward the interior of said casing so as to further cause said slurry liquid to move away for said sealing face and toward said interior of said casing.

* * * * *